Dec. 31, 1963     C. J. LUDWIG     3,115,993
COFFEE DISPENSER
Filed June 6, 1962
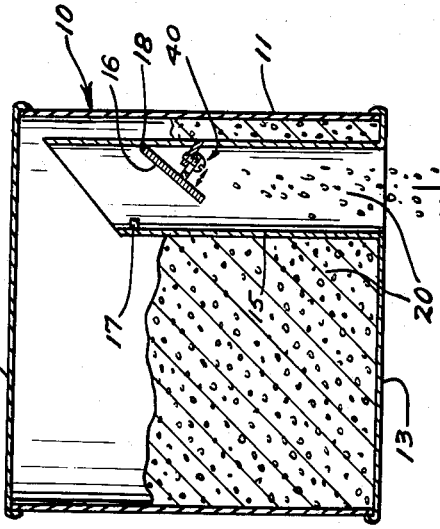
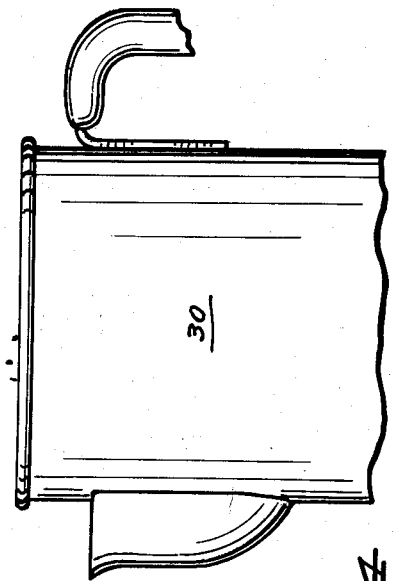
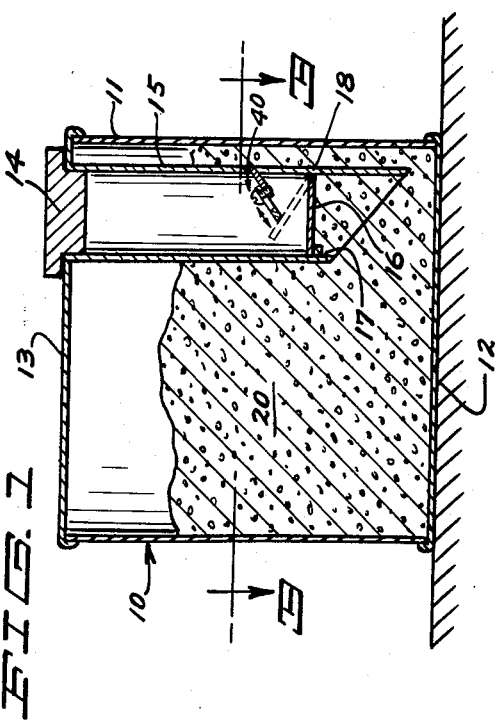
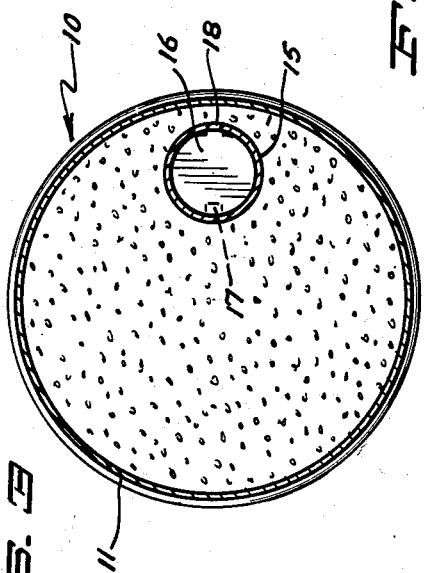
INVENTOR.
CARL J. LUDWIG
BY
Carlsen & Carlsen
ATTORNEYS

United States Patent Office 3,115,993
Patented Dec. 31, 1963

3,115,993
COFFEE DISPENSER
Carl J. Ludwig, 4730 Yates Ave. N.,
Minneapolis, Minn.
Filed June 6, 1962, Ser. No. 200,541
13 Claims. (Cl. 222—456)

This invention relates to the art of dispensing material from containers and is more particularly related to apparatus for dispensing a predetermined amount of particulate material from a container.

Many substances in common use around a household and other locations are particulate in nature and their use is such that predetermined amounts of such material are generally utilized. As an example, the familiar coffee can contains coffee beans which have been ground to form a particulate material and which are customarily utilized in units of one tablespoon for each cup of coffee to be made. In many applications, the material is removed from the original container and placed in a further more attractive container, such as a canister, which is of substantially the same construction, namely that of an open ended cylinder with a cover therefor. A measuring spoon, or the like, is then used to dispense the material in the required amounts. The prior art has recognized the desirability of having a means or device for dispensing the particulate material in portions having equal content. One apparatus which has been proposed is constructed with a tube extending through the cover of a container. The tube is open at both ends and the lower end extends into proximity to the bottom of the container. When the container is turned upside down, a limited amount of particulate material falls through the tube and into the area in which the material will be utilized. It is fairly easy to see that the ability to measure out a predetermined amount of material is extremely limited. This is so not only for the reason that the material in proximity to the end of the tube will tend to fall in the tube when the container is turned upside down but also, and more importantly, because the particulate material has a tendency to rise into the tube when the container is in an upright position.

In the present invention, means are provided to dispense only a predetermined amount of the particulate material.

It is therefore an object of the present invention to provide apparatus for dispensing predetermined amounts of particulate material from a container.

A further object of the invention is to provide apparatus, including a valve, which dispenses equal amounts of particulate material from within a container.

Another object of the present invention is to provide a valve mechanism for use in dispensing particulate material from a container.

These and other more detailed and specific objects will be disclosed in the course of the following specification, reference being had to the accompanying drawings, in which:

FIG. 1 is a side sectional view of a container embodying the principles of my invention in an upright position.

FIG. 2 is a sectional side view of the apparatus of FIG. 1 in an inverted dispensing position.

FIG. 3 is a top sectional view of the apparatus shown in FIG. 1 taken along section line 3—3, and FIG. 4 is a representation of a coffee maker.

Referring now to the drawings, there is shown in FIG. 1 a container indicated generally by the reference character 10. Container 10 includes a cylindrical side wall 11 to which is attached a bottom member 12 and a cover member 13. Attached to cover member 13 and extending downwardly therefrom is a cylindrical duct 15 which is inclined at its lower extremity in proximity to bottom member 12 of the container. A suitable removable cover 14 is shown in position on the top end of duct 15. A flap valve member 16 is journalled for rotation about a pin indicated by reference character 18. A pair of stop members 17 and 40 are shown positioned to engage valve member 16 at predetermined positions for purposes which will be explained below. Container 10 is filled with a particulate material such as coffee, indicated by the reference character 20.

In the embodiment shown in the drawings the duct 15 is an integral portion of cover member 13 which in turn is affixed to side members 11 at their upper extremities and as such would incorporate the techniques currently in use for sealing the familiar tin can or the like. Hermetic sealing would be possible by providing a suitable cover member 14 which would be attached in fluid-tight relationship to duct 15 so as to maintain a pressure differential between the inside and outside of container 10. It will be noted that the lower end of duct 15 is inclined and that valve member 16 is positioned a predetermined distance from the bottom of duct 15 so as to define a chamber, when in the upright position, of predetermined volume. It is contemplated that valve member 16 will be of sufficient weight in relation to the upward force exerted by the particulate material to maintain the valve member 16 in a position substantially parallel to cover member 13 or normal to duct 15 so as to prevent the particulate material from rising into duct 15 and thereby provide equal volumes of material each time the dispenser is used. Stop member 17 serves to limit the downward motion of valve member 16. Stop member 17 is shown by way of example only as other devices may be utilized to position valve member 16 when the dispenser is in an upright position.

Further stop member 40, which may be adjustable, may be utilized to prevent valve member 16, upon inversion of the container, from opening beyond a predetermined point. Dependent upon the characteristics of the particulate material, it may, in some cases, be desirable to control the rate at which the material flows downwardly through the duct 15 when the container is in an inverted, material dispensing position. For example, in the embodiment shown, the bottom portion of duct 15 is inclined or cut at an angle and it is contemplated that the particulate material will tend to slide down the inclined end of the duct so that the chamber will always be filled with a predetermined amount of material. If the material were allowed to fall freely through the duct, it is conceivable that more than the predetermined amount that is desired, as determined by the chamber at the end of the duct 15, would be dispensed. By controlling the rate at which the material flows through the duct, a sufficient time is allowed for the surplus material to slide off the end of duct 15. This feature may also be useful where various other configurations for the lower end of duct 15 are utilized.

In operation, the cover member 14 is removed and the container is inverted as shown by the arrow extending between FIGS. 1 and 2. Valve member 16 drops to the dispensing position shown in dotted outline and a predetermined quantity of material is dispensed into, for example, the coffee maker shown by way of illustration on FIG. 4. When the container is again placed in an upright position as in FIG. 1, the valve member 16 falls, through the force of gravity, to its normal position to prevent the particulate material from rising within duct 15. Upon inversion, the predetermined amount of material is again dispensed from the container.

Although valve member 16 is shown as a disc which is journalled for rotation about a pin member 18 mounted in the side of duct 15, many other methods of attaching a movable valve member within duct 15 will occur to those skilled in the art. While stop member 40 is shown in a particular configuration, namely that of a slotted slidable member which may be adjustably positioned on a mounting therefor, it is anticipated that other forms of stops may readily occur to those skilled in the art upon learning of the feature of my invention.

It is also contemplated that a cover assembly for use with containers of various sizes and shapes may be constructed according to the principles of my invention rather than be formed as an integral part of a container as in the preferred embodiment. In such an application, a cover member 13 would be of suitable size and shape to tightly fit over the top of a container from which material is to be dispensed. The length and size of duct 15 would be commensurate with the size of the container from which the material is to be dispensed and the characteristics of the particulate material.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A dispenser for dispensing predetermined amounts of particulate material comprising in combination; a hollow container for particulate material, said container having a cover and a bottom surface; a duct extending through said cover and inwardly of said container through said cover and into proximity with the bottom surface thereof; and a flap valve within said duct and journalled for rotation about one side of said duct, said flap valve and the end of said duct defining a chamber for a predetermined quantity of material and being operative to prevent the passage of particulate material therethrough when said container is in a first upright position and to allow the passage of such material when in a second inverted position.

2. The apparatus of claim 1 in which a stop member is mounted on said duct to maintain said flap valve substantially parallel to the top surface when said flap valve is in said first position.

3. The apparatus of claim 1 in which a stop member is mounted on said duct to position said flap valve in said second position so as to tend to control the rate of flow of said particulate material.

4. The apparatus of claim 1 in which the lower extremity of the duct is inclined.

5. A dispenser for attachment to containers for dispensing predetermined amounts of particulate material, comprising in combination; a cover member; a duct extending through said cover member into proximity of the bottom of a container; a valve member mounted within said duct member, said valve member being operable between first and second positions in response to the attitude of said duct so as to limit the flow of particulate material into said duct to a predetermined amount when in one position and to allow the flow of said predetermined amount of particulate material therethrough when in the other position.

6. The apparatus of claim 5 in which the lower extremity of the duct is inclined.

7. The apparatus of claim 5 in which a stop means is used to position the valve member substantially normal to the longitudinal axis of the duct when said valve member is in said first position.

8. The apparatus of claim 6 in which an adjustable stop means is used to position said valve member in said second position whereby the rate of flow of the particulate material may be controlled in accordance with the characteristics thereof.

9. The apparatus of claim 1 in which the duct is positioned at one side of the cover.

10. The apparatus of claim 4 in which the end of the duct extends substantially to the bottom of the container.

11. The apparatus of claim 4 in which a stop member is mounted on the inside of the duct to limit the movement of the flap valve member when the container is in an inverted position to thereby allow surplus particulate material to flow down and around the inclined lower extremity of the duct.

12. The apparatus of claim 5 in which the duct is positioned at one side of the cover.

13. The apparatus of claim 6 in which the end of the duct extends substantially to the bottom of the container.

References Cited in the file of this patent

UNITED STATES PATENTS

| | | |
|---|---|---|
| 415,609 | Brink | Nov. 19, 1889 |
| 1,276,382 | Loveland | Aug. 20, 1918 |
| 2,222,594 | Metcalf | Nov. 26, 1940 |
| 2,501,636 | Smith | Mar. 21, 1950 |

FOREIGN PATENTS

| | | |
|---|---|---|
| 205,699 | Austria | Oct. 10, 1959 |